United States Patent
Yang et al.

(10) Patent No.: US 10,621,907 B2
(45) Date of Patent: Apr. 14, 2020

(54) METHOD AND DEVICE FOR ADJUSTING UNIFORMITY, APPARATUS, AND COMPUTER READABLE STORAGE MEDIUM

(71) Applicant: BOE TECHNOLOGY GROUP CO., LTD., Beijing (CN)

(72) Inventors: Fan Yang, Beijing (CN); Pengpeng Feng, Beijing (CN); Xin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/994,018

(22) Filed: May 31, 2018

(65) Prior Publication Data

US 2019/0080643 A1    Mar. 14, 2019

(30) Foreign Application Priority Data

Sep. 12, 2017    (CN) .......................... 2017 1 0816242

(51) Int. Cl.
*G09G 3/32* (2016.01)
*G09G 3/20* (2006.01)
*G06F 3/14* (2006.01)

(52) U.S. Cl.
CPC ............. *G09G 3/32* (2013.01); *G09G 3/2096* (2013.01); *G06F 3/1446* (2013.01);
(Continued)

(58) Field of Classification Search
CPC .................... G09G 3/32; G09G 3/2096; G09G 2320/0233; G09G 2300/0842
See application file for complete search history.

(56) References Cited

U.S. PATENT DOCUMENTS

2004/0036697 A1    2/2004 Kim et al.
2008/0106503 A1*   5/2008 Cok ..................... G09G 3/3208
                                               345/80
(Continued)

FOREIGN PATENT DOCUMENTS

CN    104848094 A    8/2015
CN    106596068 A    4/2017
(Continued)

OTHER PUBLICATIONS

First Office Action dated Nov. 4, 2019 corresponding to Chinese application No. 201710816242.1.

*Primary Examiner* — Abbas I Abdulselam
(74) *Attorney, Agent, or Firm* — Nath, Goldberg & Meyer; Joshua B. Goldberg; Stephanie Majkut

(57) ABSTRACT

The present disclosure provides a method for adjusting uniformity, a device for adjusting uniformity, an apparatus, and a computer readable storage medium. The method includes powering a spliced display device with different power supplying configurations within a first voltage range, acquiring brightness information of display areas of splicing components of the spliced display device under the power supplying configurations; calculating uniformities of the spliced display device under the power supplying configurations according to the brightness information, and determining the power supplying configuration corresponding to a maximum uniformity.

16 Claims, 8 Drawing Sheets

S15
Powering a spliced display device with different power supplying configurations within a first voltage range, and acquiring brightness information of display areas of splicing components of the spliced display device under the power supplying configurations S16
Calculating uniformities of the spliced display device under the power supplying configurations according to the brightness information, and determining the power supplying configuration corresponding to a maximum uniformity

(52) U.S. Cl.
CPC ............... *G09G 2300/026* (2013.01); *G09G 2300/0842* (2013.01); *G09G 2320/0233* (2013.01); *G09G 2330/02* (2013.01)

(56) References Cited

U.S. PATENT DOCUMENTS

| | | | | |
|---|---|---|---|---|
| 2011/0025724 | A1* | 2/2011 | Hur | G02B 6/008 345/690 |
| 2012/0105505 | A1* | 5/2012 | Wei | G09G 3/3426 345/690 |
| 2014/0333518 | A1* | 11/2014 | Zhang | G09G 3/36 345/102 |
| 2016/0322006 | A1* | 11/2016 | Chen | G09G 3/3426 |

FOREIGN PATENT DOCUMENTS

| | | |
|---|---|---|
| CN | 106713903 A | 5/2017 |
| TW | 513895 B | 12/2002 |

\* cited by examiner

METHOD AND DEVICE FOR ADJUSTING UNIFORMITY, APPARATUS, AND COMPUTER READABLE STORAGE MEDIUM

CROSS-REFERENCE TO RELATED APPLICATIONS

The present application claims priority of the Chinese Patent Application No. 201710816242.1, filed on Sep. 12, 2017, the contents of which are incorporated herein in their entirety by reference.

TECHNICAL FIELD

The present disclosure relates to the field of display device adjustment technology, and in particular, relates to a method for adjusting uniformity, a device for adjusting uniformity, an apparatus, and a computer readable storage medium.

BACKGROUND

As the degree of informationization in human society increases, a large-sized spliced display device can provide immersive visual experiences to a user and thus becomes popular in the market, due to being capable of achieving unique large-scene display effects.

SUMMARY

Embodiments of the present disclosure provide a method for adjusting uniformity, a device for adjusting uniformity, an apparatus, and a computer readable storage medium.

In a first aspect, embodiments of the present disclosure provide a method for adjusting uniformity, including steps of:

powering a spliced display device with different power supplying configurations within a first voltage range, and acquiring brightness information of display areas of splicing components of the spliced display device under the power supplying configurations; and calculating uniformities of the spliced display device under the power supplying configurations according to the brightness information, and determining the power supplying configuration corresponding to a maximum uniformity.

In an embodiment, the method further includes steps of:

powering the spliced display device with power supplying configurations having a same current, and acquiring brightness information of the display areas under the power supplying configurations having the same current; and determining a first display area and a second display area which have a maximum brightness difference therebetween, according to the brightness information of the display areas under the power supplying configurations having the same current;

wherein the steps of calculating uniformities of the spliced display device under the power supplying configurations according to the brightness information, and determining the power supplying configuration corresponding to a maximum uniformity include steps of:

calculating uniformities under the power supplying configurations, according to the brightness information of the first display area and the second display area under the power supplying configurations; and determining the power supplying configuration corresponding to a maximum uniformity according to calculated uniformities.

In an embodiment, the steps of powering a spliced display device with different power supplying configurations within the first voltage range, and acquiring brightness information of display areas of splicing components of the spliced display device under the power supplying configurations include steps of:

traversing a first set of power supplying configurations, and acquiring a first set of brightness information of the first display area and the second display area under the first set of power supplying configurations, wherein each of the first set of power supplying configurations is within the first voltage range, and an interval between any two adjacent voltages in each of the first set of power supplying configurations is a first voltage;

calculating a first set of uniformities according to the first set of brightness information, and determining a uniformity increasing section and a second voltage range corresponding to the uniformity increasing section according to the first set of uniformities;

generating a second set of power supplying configurations according to the second voltage range, wherein each of the second set of power supplying configurations is within the second voltage range, an interval between any two adjacent voltages in each of the second set of power supplying configurations is a second voltage, and the second voltage is less than the first voltage; and traversing the second set of power supplying configurations, and acquiring a second set of brightness information of the first display area and the second display area under the second set of power supplying configurations;

wherein the steps of calculating uniformities of the spliced display device under the power supplying configurations according to the brightness information, and determining the power supplying configuration corresponding to a maximum uniformity include steps of:

calculating a second set of uniformities according to the second set of brightness information; and determining the power supplying configuration corresponding to a maximum uniformity according to the second set of uniformities.

In an embodiment, the power supplying configurations include power supplying configurations for light-emitting components of the spliced display device or power supplying configurations for the splicing components of the spliced display device.

In an embodiment, the method further includes steps of;

Selecting a part of the light-emitting components or splicing components of the spliced display device which have small contribution to the uniformities according to a manner in which the uniformities are calculated; and simplifying each of the power supplying configurations according to a selection result obtained in the step of selecting.

In an embodiment, the brightness information represents one of a brightness at a center point of each of the display areas and a light intensity of each of the light-emitting components.

In a second aspect, embodiments of the present disclosure provide a device for adjusting uniformity, including a programmable power supply, an acquisition device, and an adjustor, wherein the programmable power supply is configured to power a spliced display device with different power supplying configurations within a first voltage range;

the acquisition device is configured to acquire brightness information of display areas of splicing components of the spliced display device under the power supplying configurations; and the adjustor is configured to calculate uniformities of the spliced display device under the power supplying configurations according to the brightness information, and determine the power supplying configuration corresponding to a maximum uniformity.

In an embodiment, the programmable power supply is further configured to power the spliced display device with power supplying configurations having a same current;

the acquisition device is further configured to acquire brightness information of the display areas under the power supplying configurations having the same current; and the adjustor includes:
a comparison area determination component, configured to determine a first display area and a second display area which have a maximum brightness difference therebetween, according to the brightness information of the display areas under the power supplying configurations having the same current;
a calculator, configured to calculate uniformities under the power supplying configurations, according to the brightness information of the first display area and the second display area under the power supplying configurations; and
an adjustment component, configured to determine the power supplying configuration corresponding to a maximum uniformity according to calculated uniformities.

In an embodiment, the programmable power supply is further configured to traverse a first set of power supplying configurations and a second set of power supplying configurations, respectively, wherein each of the first set of power supplying configurations is within the first voltage range, an interval between any two adjacent voltages in each of the first set of power supplying configurations is a first voltage, each of the second set of power supplying configurations is within a second voltage range, an interval between any two adjacent voltages in each of the second set of power supplying configurations is a second voltage, and the second voltage is less than the first voltage;

the acquisition device is further configured to acquire a first set of brightness information of the first display area and the second display area under the first set of power supplying configurations, and acquire a second set of brightness information of the first display area and the second display area under the second set of power supplying configurations;

the calculator is further configured to calculate a first set of uniformities according to the first set of brightness information, and calculate a second set of uniformities according to the second set of brightness information; and the adjustment component is further configured to determine a uniformity increasing section and the second voltage range corresponding to the uniformity increasing section according to the first set of uniformities, generate the second set of power supplying configurations according to the second voltage range, and determine the power supplying configuration corresponding to a maximum uniformity according to the second set of uniformities.

In an embodiment, the power supplying configurations include power supplying configurations for light-emitting components of the spliced display device or power supplying configurations for the splicing components of the spliced display device.

In an embodiment, the adjustor further includes:
a selector, configured to select a part of the light-emitting components or splicing components of the spliced display device which have small contribution to the uniformities according to a manner in which the uniformities are calculated; and
a configuration simplification component, configured to simplify each of the power supplying configurations according to a selection result obtained from the selector.

In an embodiment, the acquisition device includes one of an image sensor and an illuminometer, the brightness information represents a brightness at a center point of each of the display areas in a case where the acquisition device includes the image sensor, and represents a light intensity of each of the light-emitting components in a case where the acquisition device includes the illuminometer.

In a third aspect, embodiments of the present disclosure provide another method for adjusting uniformity, including steps of:
calculating brightness information of display areas of splicing components of a spliced display device under different power supplying configurations within a first voltage range, according to a correspondence relationship between a current and a light intensity; and
calculating uniformities of the spliced display device under the power supplying configurations according to the brightness information, and determining the power supplying configuration corresponding to a maximum uniformity.

In an embodiment, the method further includes steps of:
calculating brightness information of the display areas under power supplying configurations having a same current; and
determining a first display area and a second display area which have a maximum brightness difference therebetween, according to the brightness information of the display areas under the power supplying configurations having the same current;
wherein the steps of calculating uniformities of the spliced display device under the power supplying configurations according to the brightness information, and determining the power supplying configuration corresponding to a maximum uniformity include steps of:
calculating uniformities under the power supplying configurations, according to the brightness information of the first display area and the second display area under the power supplying configurations; and
determining the power supplying configuration corresponding to a maximum uniformity according to calculated uniformities.

In an embodiment, a manner in which the uniformity is calculated is as follows:

$$U = L_M / L_N = (K_M E_M)/(K_N E_N) = \left(K_M \sum_{j=1}^{k} \frac{I_{Mj}}{S_{Mj}^2}\right) / \left(K_N \sum_{j=1}^{k} \frac{I_{Nj}}{S_{Nj}^2}\right),$$

where U is the uniformity, $L_M$ and $L_N$ are brightnesses at center points of the first display area and the second display area, respectively, $K_M$ and $K_N$ are correction coefficients for the first display area and the second display area, respectively, $E_M$ and $E_N$ are illuminations at the center points of the first display area and the second display area, respectively, j is a serial number of each of the light-emitting components of the spliced display device, k is a quantity of the light-emitting components, $I_{Mj}$ and $I_{Nj}$ are light intensities of a $j^{th}$ one of the light-emitting components at the center points of the first display area and the second display area, respectively, and $S_{Mj}$ and $S_{Nj}$ are distances from the $j^{th}$ light-emitting component to the center points of the first display area and the second display area, respectively.

In an embodiment, the power supplying configurations include power supplying configurations for light-emitting components of the spliced display device or power supplying configurations for the splicing components of the spliced display device.

For example, the power supplying configurations having a same current mean that the light-emitting components of the spliced display device have a same current or the splicing components of the spliced display device have a same current.

In an embodiment, the method further includes steps of:

selecting a part of the light-emitting components or splicing components of the spliced display device which have small contribution to the uniformities according to a manner in which the uniformities are calculated; and simplifying each of the power supplying configurations according to a selection result obtained in the step of selecting.

In a fourth aspect, embodiments of the present disclosure further provide an apparatus, including: at least one processor; and a memory, configured to store at least one program, wherein when executed by the at least one processor, the at least one program causes the at least one processor to perform the method for adjusting uniformity according to the embodiments of the present disclosure.

In a fifth aspect, embodiments of the present disclosure further provide a computer readable storage medium having a computer program stored thereon, wherein when executed by a processor, the computer program implements the method for adjusting uniformity according to the embodiments of the present disclosure.

BRIEF DESCRIPTION OF THE DRAWINGS

In order to make a person better understand the disclosure, the following detailed description of non-limiting embodiments will be made with reference to the following figures, wherein.

DETAILED DESCRIPTION

The present disclosure will be described in detail below with reference to the accompanying drawings and embodiments. It should be noted that, the embodiments described herein are only for the purpose of explaining the present disclosure, but are not intended to limit the present disclosure. It should be further noted that, only some embodiments of the present disclosure are illustrated in the accompanying drawings, for ease of description.

It should be noted that, the embodiments of the present disclosure and the features in the embodiments can be combined with each other in a case where no conflict occurs. The present disclosure will be described in detail below with reference to the drawings in conjunction with various embodiments.

The inventors of the present disclosure have found that, as the size of a spliced display device increases, the spliced display device have different brightness at different splicing display areas. As a result, a problem that the overall brightness of the spliced display device is not uniform occurs, which causes the visual effect to degrade. For solving this problem, it is necessary to maximize the brightness uniformity (which may be simply referred to as "uniformity" in a case where no confusion occurs) of the spliced display device, thereby enabling the spliced display device to present the best visual effect.

A traditional method for adjusting the uniformity of a spliced display device requires manual adjustment and cannot achieve automatic adjustment. Since the spliced display device may have a large number of splicing components and a large number of light-emitting components therein, the manual adjustment is very complicated. As the size of the spliced display device becomes larger, the manual adjustment becomes more inconvenient.

Therefore, it is desirable to provide a method and a device which are capable of automatically and efficiently adjusting brightness uniformity of a spliced display device.

Figure 1:
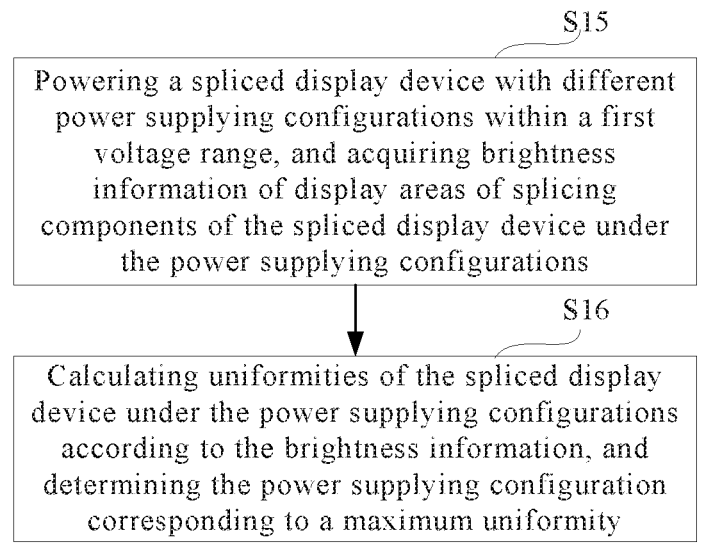
FIG. 1 is a schematic flowchart showing a method for adjusting uniformity according to an embodiment of the present disclosure.

FIG. 1 is a schematic flowchart showing a method for adjusting uniformity according to an embodiment of the present disclosure.

As shown in FIG. 1, the present embodiment of the present disclosure provides a method for adjusting uniformity, including the following steps S15 and S16.

The step S15 includes powering the spliced display device with different power supplying configurations within a first voltage range, and acquiring brightness information of display areas of all splicing components of the spliced display device under the power supplying configurations.

The step S16 includes calculating uniformities of the spliced display device under the power supplying configurations according to the brightness information, and determining the power supplying configuration corresponding to a maximum uniformity.

In the embodiment, for example, the first voltage range may be a voltage range meeting a display brightness required by the spliced display device (e.g., a spliced LED display panel, a transparent spliced LED display panel, or the like), and the spliced display device may be a transparent spliced LED display panel formed by splicing a plurality of splicing components with each other.

Figure 2:
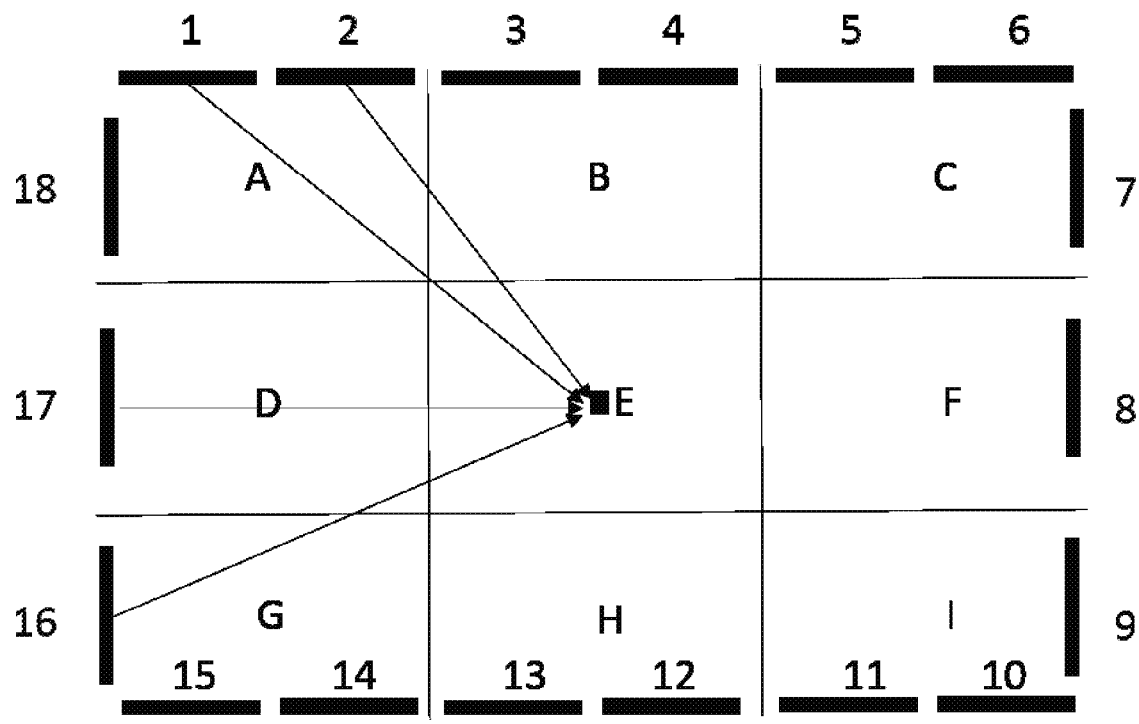
FIG. 2 is a schematic diagram showing an arrangement of light-emitting components of a spliced display device according to an embodiment of the present disclosure.

FIG. 2 is a schematic diagram showing an arrangement of light-emitting components of a spliced display device according to an embodiment of the present disclosure. Hereinafter, the method for adjusting uniformity shown in FIG. 1 is described by taking a case where a uniformity (e.g., a brightness uniformity) of the spliced display device shown in FIG. 1 is adjusted as an example.

As shown in FIG. 2, the transparent spliced LED display panel is formed by splicing 9 splicing components A to I (hereinafter, the reference symbols "A" to "I" may denote the 9 splicing components and display areas corresponding thereto, respectively) with each other, and the splicing components have the display areas A to I, respectively. In an example, a first splicing component, which has the display area A, is provided with LED strip lights 1, 2 and 18 as light-emitting components. A second splicing component, which has the display area B, is provided with LED strip lights 3 and 4 as light-emitting components. A third splicing component, which has the display area C, is provided with LED strip lights 5, 6 and 7 as light-emitting components. A fourth splicing component, which has the display area D, is provided with an LED strip light 17 as a light-emitting component. A fifth splicing component, which has the display area E, is not provided with any light-emitting component. A sixth splicing component, which has the display area F, is provided with an LED strip light 8 as a light-emitting component. A seventh splicing component, which has the display area G, is provided with LED strip lights 14, 15 and 16 as light-emitting components. An eighth splicing component, which has the display area H, is provided with LED strip lights 12 and 13 as light-emitting components. A ninth splicing component, which has the display area I, is provided with LED strip lights 9, 10 and 11 as light-emitting components.

In the step S15, for the transparent spliced LED display panel, the first voltage range meeting the display brightness thereof may range from 45V to 50V, i.e., voltages ranging from 45V to 50V may be applied to the LED strip lights 1 to 18, respectively. In other words, an operating voltage of each of the LED strip lights 1 to 18 may range from 45V to 50V.

In the present disclosure, the term "power supplying configuration" may refer to a combination of operating voltages or operating currents applied to the light-emitting components (e.g., the LED strip lights 1 to 18) of the spliced display device (e.g., by a programmable power supply 101 described below).

For example, for the LED strip lights 1 to 18 as shown in FIG. 2, one power supplying configuration may include 18 voltages applied to the LED strip lights 1 to 18, respectively, or 9 voltages applied to the splicing components A to I, respectively. Alternatively, one power supplying configuration may include at least one current applied to the LED strip lights 1 to 18, respectively, or applied to the splicing components A to I, respectively.

In an embodiment, by taking an interval of 0.5V as an example, the first voltage range of 45V to 50V may include the following 11 voltages: 45V, 45.5V, 46V, 46.5V, 47V, 47.5V, 48V, 48.5V, 49V, 49.5V, and 50V. In this case, for the LED strip lights 1 to 18, the 11 voltages are traversed to generate 11*18=198 power supplying configurations. In the present disclosure, the term "traverse" may mean employing each voltage in a set of voltages exactly once for each LED strip light or each splicing component. In an example, in a case where the geometric center of the display area E is taken as a reference point, since the 16 LED strip lights other than the LED strip lights 8 and 17 are substantially centro-symmetric (i.e., there exist such LED strip light groups, wherein each LED strip light group includes 4 LED strip lights equivalent to each other, such as LED strip lights 1, 2, 10 and 11, LED strip lights 3, 4, 12 and 13, LED strip lights 5, 6, 14 and 15, and the like), and since the LED strip lights 8 and 17 are substantially left-right symmetric, the 198 power supplying configurations may be simplified as 16*11/4 2*11/2=55 power supplying configurations.

In another embodiment, by taking an interval of 0.1V as an example, the first voltage range of 45V to 50V may include 51 voltages. In this case, for the LED strip lights 1 to 18, the fifty one voltages are traversed to generate 51*18=918 power supplying configurations. By the above method, the 918 power supplying configurations may be simplified as 255 power supplying configurations. In a similar manner, in different embodiments, power supplying configurations may be generated with different intervals as desired.

By taking the 55 power supplying configurations with the interval of 0.5V as an example, a programmable power supply may be employed to apply the 55 power supplying configurations to the transparent spliced LED display panel sequentially, and brightness information of the display areas A to I under each of the power supplying configurations may be acquired.

A type of the brightness information may depend on a type of an acquisition device. For example, in a case where the acquisition device is an image sensor (e.g., a CCD), the brightness information of each of the display areas acquired by the image sensor may represent a brightness at a center point of the display area. In a case where the acquisition device is an illuminometer, the brightness information of each of the display areas acquired by the illuminometer may be a light intensity of the light-emitting component in the display area.

In the step S16, uniformities $U_1$ to $U_{55}$ of the transparent spliced LED display panel under the power supplying configurations may be calculated according to 55 groups of brightness information acquired in the step S15, respectively. Then, a maximum uniformity $U_{max}$=max ($U_1$, $U_2$, ..., $U_{55}$) is obtained therefrom, and the power supplying configuration corresponding to the maximum uniformity $U_{max}$ may be determined as an adjustment result.

As described above, since the display areas A, C, G and I are centrosymmetric, and the display areas B, D, F and H are also centrosymmetric, only the display areas A, B and E may be compared with each other when the uniformity is calculated.

Description is made by taking a case where the uniformity $U_1$ is calculated as an example.

In a case where the brightness information represents a brightness L at the center point of each of the display areas, only brightnesses $L_{1A}$, $L_{1B}$ and $L_{1E}$ at the center points of the display areas A, B and E may be compared with each other to obtain a minimum brightness $L_{1E}$ and a maximum brightness $L_{1A}$, and the uniformity $U_1$ may be calculated as $U_1 = L_{1E}/L_{1A}$.

In a case where the brightness information represents light intensities $I_1$ to $I_{18}$ of the light-emitting components, uniformities $U_{AB}$, $U_{AE}$ and $U_{BE}$ between any two ones of the display areas A, B and E are calculated respectively, and the minimum uniformity thereof is obtained as the final uniformity, i.e., $U_1$=min ($U_{AB1}$, $U_{AE1}$, $U_{BE1}$).

Herein, the uniformity $U_{AB1}$ between the display areas A and B under the first power supplying configuration may be calculated in the following manner;

$$U_{AB1} = \left( K_A \sum_{j=1}^{18} \frac{I_{Aj}}{S_{Aj}^2} \right) \Big/ \left( K_B \sum_{j=1}^{18} \frac{I_{Bj}}{S_{Bj}^2} \right);$$

and if $U_{AB1}>1$, then the reciprocal thereof is obtained, where, $K_A$ and $K_B$ are correction coefficients for the display area A and the display area B (and may be determined in advance by experiments), respectively, j is a serial number of each of the LED strip lights as shown in FIG. 2, $I_{Aj}$ and $I_{Bj}$ are light intensities of the $j^{th}$ LED strip light at the center points of the display area A and the display area B, respectively, and $S_{Aj}$ and $S_{Bj}$ are distances from (e.g., the geometric center point of) the $j^{th}$ LED strip light to the center points of the display area A and the display area B, respectively.

Uniformities $U_{AE1}$ and $U_{BE1}$ are calculated in the same manner as that of the uniformity $U_{AB1}$.

A person skilled in the art should understand that, the spliced display device in FIG. 2 is merely illustrated as an example. In other embodiments, the method for adjusting uniformity provided by the present disclosure as well as a device for adjusting uniformity, an apparatus, and a computer readable storage medium to be described below may be applied to a spliced display device with different shapes (such as a circular shape, a trapezoidal shape, an irregular shape, etc.), different structures (e.g., being provided with different quantities of and/or different kinds of light-emitting components, the light-emitting components being provided at different positions in the splicing components, being provided with a curved surface panel, the panel being coupled into another component, etc.), and/or spliced in different manners (e.g., in an end-to-end connection to form a ring, grouping and then the resultant groups being spliced with each other, etc.) for uniformity adjustment, and a same technical effect may be achieved. Further, in other embodiments, a first voltage range may be defined as long as the requirement of display brightness of the spliced display device is met, and the same technical effect may be achieved in this case.

Further, in the above embodiments, the spliced display device shown in FIG. 2 allows different voltages to be applied to the light-emitting components (e.g., the LED strip lights 1 to 18) of the splicing components, thus the power supplying configurations may include power supplying configurations for the light-emitting components of the spliced display device. In other embodiments, it may be necessary to adjust a uniformity of a spliced display device which allows a same operating voltage to be applied to the light-emitting components of each of the splicing components, and in this case, the power supplying configurations may include power supplying configurations for the splicing components of the spliced display device. For example, for the spliced display device including the 9 splicing components, the power supplying configurations may include a supplying voltage $V_1$ for the first splicing component to a supplying voltage $V_9$ for the ninth splicing component, and may not include power supplying configurations for each of the light-emitting components.

In the above embodiments, the spliced display device is actually powered by automatically traversing different power supplying configurations meeting the brightness requirements, to acquire brightness information corresponding to the power supplying configurations, and uniformities are calculated according to the brightness information, thereby determining the power supplying configuration corresponding to the maximum uniformity. In this way, automatic adjustment of a uniformity of the spliced display device is achieved.

Figure 3:
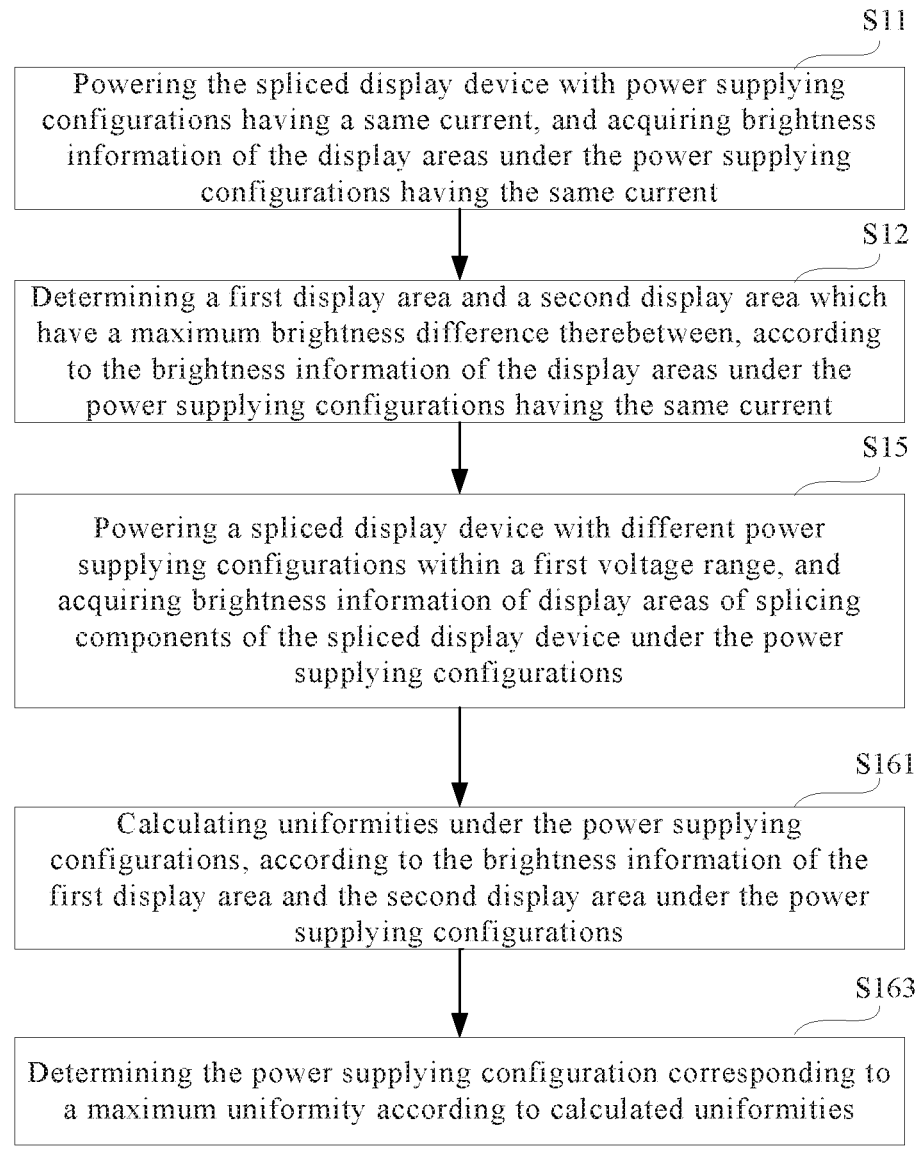
FIG. 3 is a schematic flowchart showing an exemplary implementation of the method shown in FIG. 1.

FIG. 3 is a schematic flowchart showing an exemplary implementation of the method shown in FIG. 1. As shown in FIG. 3, in the exemplary implementation, the method may further include the following steps S11 and S12.

The step S11 includes powering the spliced display device with power supplying configurations having a same current (i.e., a same electric current), and acquiring brightness information of the display areas under the power supplying configurations having the same current. The power supplying configurations having the same current may refer to that the light-emitting components of the spliced display device have the same current, or the splicing components of the spliced display device have the same current.

The step S12 includes determining a first display area and a second display area which have a maximum brightness difference therebetween, according to the brightness information of the display areas under the power supplying configurations having the same current.

Further, the step S16 may include the following steps S161 and S163.

The step S161 includes calculating uniformities under the power supplying configurations, according to the brightness information of the first display area and the second display area under the power supplying configurations.

The step S163 includes determining the power supplying configuration corresponding to the maximum uniformity according to the calculated uniformities.

For example, for a spliced display device in which the light-emitting components have simple installation positions, the display areas of the spliced display device which have the maximum brightness difference therebetween may be fixed.

For example, for the spliced display device shown in FIG. 2, the display areas of the spliced display device which have the maximum brightness difference therebetween are always one of the display areas A, C, G and I and the display areas E, no matter what power supply configuration is used. Thus, by the above steps S11 and S12, the display area E and the display area A (or one of the display areas C, G and I) may be determined as the first display area and the second display area, respectively. In this way, only the display area E and the display area A (or one of the display areas C, G and I) may be employed to acquire brightness information for calculation in the step S16, whereas it is not necessary to perform calculation on the brightness information of the display area B (or one of the display areas D, F and H), thereby greatly reducing an amount of calculation. In this embodiment, in the step S15, brightness information of all display areas may be acquired, or only brightness information of the first display area and the second display area may be acquired, according to an actual acquisition device and an acquisition situation.

It should be noted that, for a spliced display device in which the light-emitting components have complicated installation positions, the method shown in FIG. 3 may not be employed. For example, in a case where LED strip lights are further provided at four sides of the display areas E, the first display area and the second display area may change as the power supplying configurations change, and for this kind of spliced display device, the method shown in FIG. 1 may be employed.

In the above embodiments, two display areas having the maximum brightness difference therebetween are selected to calculate the uniformity, and thus it is not necessary to calculate the uniformity from brightness information of all of the display areas. As a result, calculation of the uniformity is simplified, and the adjustment efficiency is increased.

Figure 4:
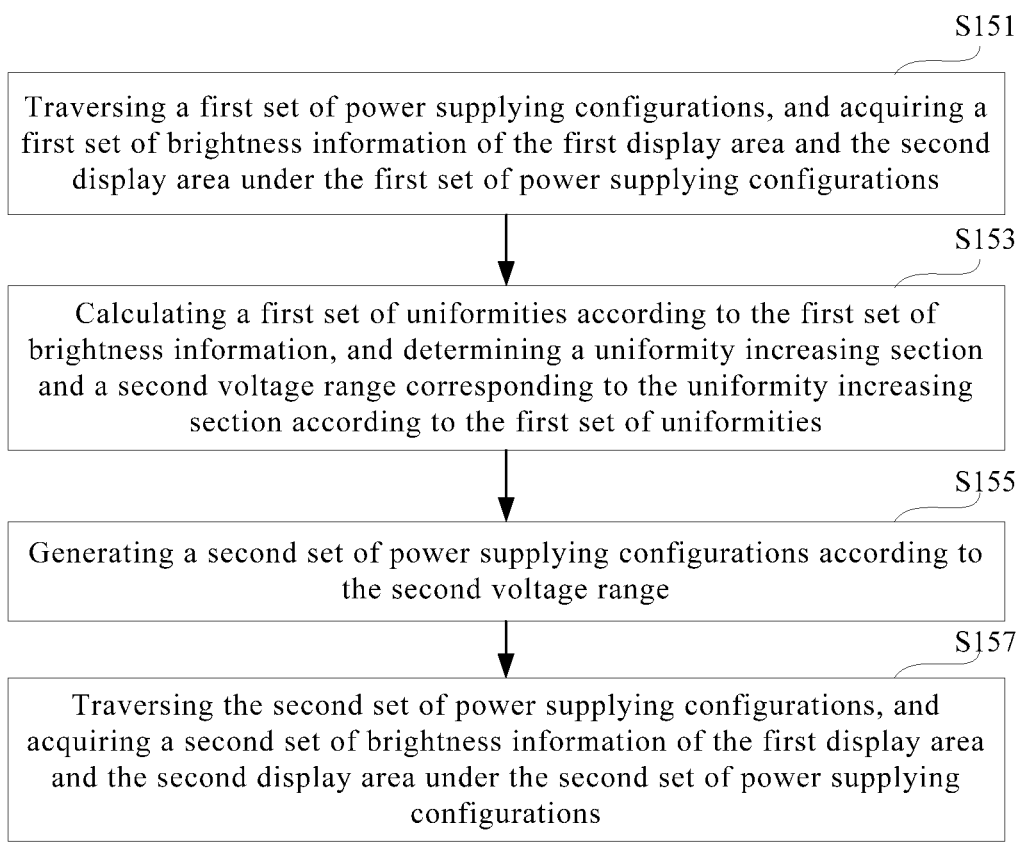
FIG. 4 is a schematic flowchart showing an exemplary implementation of step S15 of the method shown in FIG. 3.

FIG. 4 is a schematic flowchart showing an exemplary implementation of the step S15 of the method shown in FIG. 3. As shown in FIG. 4, in this exemplary implementation, the step S15 may include the following steps S151 to S157.

The step S151 includes traversing a first set of power supplying configurations, and acquiring a first set of brightness information of the first display area and the second display area under the first set of power supplying configurations. For example, each power supplying configuration of the first set of power supplying configurations is within the first voltage range, and an interval between any two adjacent voltages in each power supplying configuration of the first set of power supplying configurations is a first voltage.

The step S153 includes calculating a first set of uniformities according to the first set of brightness information, and determining a uniformity increasing section and a second voltage range corresponding to the uniformity increasing section according to the first set of uniformities. For example, the uniformity increasing section may include a plurality of uniformities increasing sequentially.

The step S155 includes generating a second set of power supplying configurations according to the second voltage range. For example, each power supplying configuration of the second set of power supplying configurations is within the second voltage range, an interval between any two adjacent voltages in each power supplying configuration of the second set of power supplying configurations is a second voltage, and the second voltage is less than the first voltage.

The step S157 includes traversing the second set of power supplying configurations, and acquiring a second set of brightness information of the first display area and the second display area under the second set of power supplying configurations.

In this case, the step S16 may include calculating a second set of uniformities according to the second set of brightness information, and determining the power supplying configuration corresponding to the maximum uniformity according to the second set of uniformities.

For example, for the method shown in FIG. 1, as described above, when the interval reduces from 0.5V to 0.1V, the quantity of the power supplying configurations increases from 55 to 255. That is, a more accurate adjustment will require traversing a larger quantity of power supplying configurations. Thus, the amount of calculation increases greatly, and the adjustment efficiency decreases. The method shown in FIG. 4 may be employed to solve this problem.

For example, in the step S151, the spliced display device is sequentially powered with the first set of power supplying configurations (including 55 power supplying configurations in total) having the interval of 0.5V, and brightness information are acquired.

In the step S153, the first set of uniformities (including 55 uniformities) are calculated according to the first set of brightness information, and a uniformity increasing section and a second voltage range (e.g., the second voltage range from 46.5V to 47.5V) corresponding to the uniformity increasing section are determined according to the first set of uniformities.

In the step S155, a second set of power supplying configurations (including 11*16/4+11*2/2=55 power supplying configurations) having the interval of 0.1V is generated according to the second voltage range (e.g., the second voltage range from 46.5V to 47.5V).

In the step S157, the spliced display device is sequentially powered with the second set of power supplying configurations (including 55 power supplying configurations) generated in the step S155, and a second set of brightness information is acquired.

Then, in the step S16, adjustment is completed by using the second set of brightness information acquired in the step S157. To perform an adjustment with a same precision, the method shown in FIG. 1 needs to traverse 255 power supplying configurations, whereas the method shown in FIG. 4 needs to traverse only 110 (i.e., 55+55) power supplying configurations. Thus, an amount of calculation for a high-precision adjustment is reduced, and the efficiency for the high-precision adjustment is increased.

Alternatively, in a case where a higher adjustment precision is desired, after the second set of brightness information is acquired in the step S157, the method may return back to the step S153 to repeat the steps S153 to S157, so as to generate a third voltage range. Alternatively, the steps S153 to S157 may be repeated twice or more, until an adjustment with a desired precision is achieved.

In the above embodiments, an amount of calculation for a high-precision adjustment is further reduced by a layered adjustment, and the efficiency for the high-precision adjustment is further increased.

Figure 5:
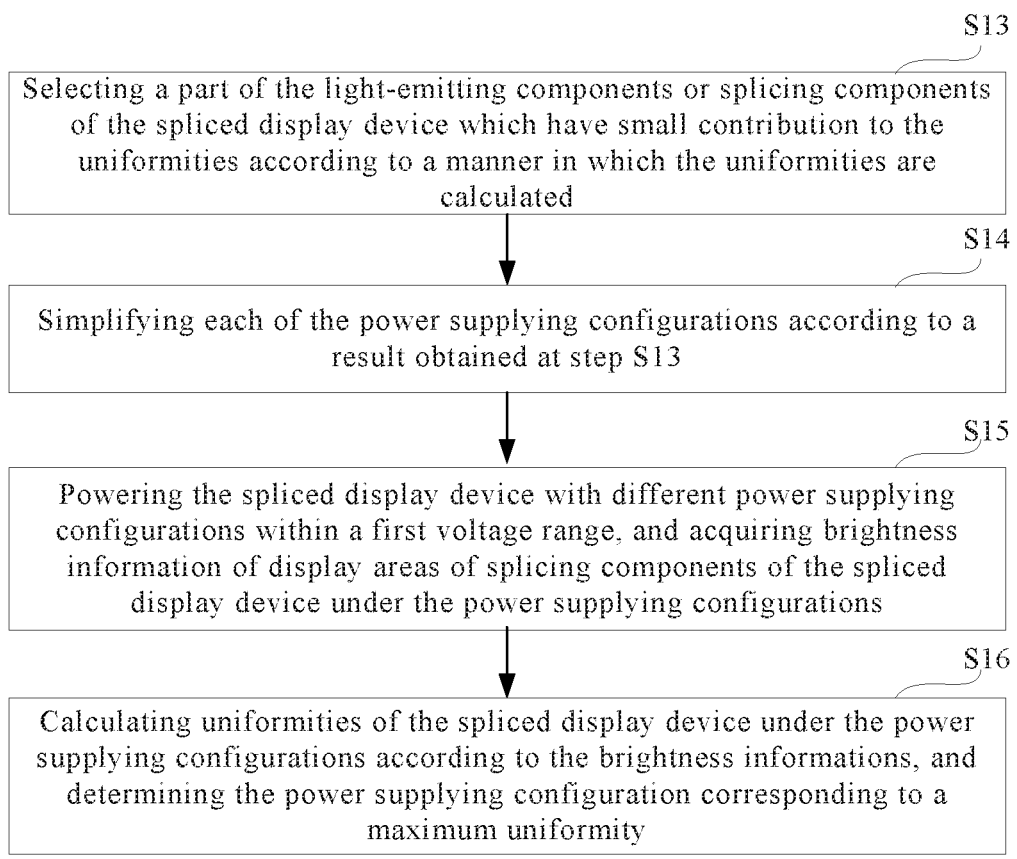
FIG. 5 is a schematic flowchart showing an exemplary implementation of the method shown in FIG. 1.

FIG. 5 is a schematic flowchart showing another exemplary implementation of the method shown in FIG. 1. As shown in FIG. 5, in this exemplary implementation, the method may further include the following steps S13 and S14.

The step S13 includes selecting the light-emitting components or the splicing components of the spliced display device which have small contribution to the uniformities according to the manner in which the uniformities are calculated.

The step S14 includes simplifying each of the power supplying configurations according to a selection result obtained in the step S23.

Specifically, according to the manner in which the uniformities are calculated, the larger a distance of a light-emitting component from a center point of a display area is, the smaller a contribution of the light-emitting component to a uniformity calculated according the brightness information of the display area is, i.e., the light-emitting component has a smaller weight. Thus, the light-emitting component may be neglected in a case where a perfect display effect is not considered.

By taking the spliced display device shown in FIG. 2 as an example, in the step S13, in a case where the display areas E and A are determined as the first display area and the second display area, respectively, the LED strip lights 6, 7, 9, 10, 15, 16 may be selected as having small contribution to uniformities, according to the distances ($S_{E1}$ to $S_{E18}$) from all the LED strip lights (e.g., the geometric center points thereof) to the center point of the display areas E, the distances ($S_{A1}$ to $S_{A18}$) from all the LED strip lights (e.g., the geometric center points thereof) to the center point of the display areas A, and the manner in which the uniformities are calculated. In this case, in the step S14, the power supplying configurations for the LED strip lights 1 to 18 may be simplified as power supplying configurations for the LED strip lights 1 to 5, 8, 11 to 14, 17 and 18 according to the result of the selecting in the step S13 (e.g., the LED strip lights 6, 7, 9, 10, 15 and 16 may be provided with any fixed voltage within the first voltage range, the fixed voltage may be a median of voltages to be traversed, an end-point value of the first voltage range, or the like). Thus, a quantity of the power supplying configurations to be traversed is reduced.

In an embodiment that the power supplying configurations include power supplying configurations for the splicing components (on the assumption that the spliced display device has the structure shown in FIG. 2), the third splicing component having the display area C, the seventh splicing component having the display area G, and the ninth splicing component having the display area I may be selected as having small contribution to uniformities in the step S13. In this case, in the step S14, the power supplying configurations for the first to ninth splicing components may be simplified as power supplying configurations for the other 6 splicing components than the third, seventh and ninth splicing components, and the third, seventh and ninth splicing components may be provided with any fixed voltage within the first voltage range.

In the above embodiments, the power supplying configurations are simplified by further analyzing weights of the light-emitting components on uniformities. Thus, an amount of calculation is reduced greatly, and the efficiency for an adjustment is further increased.

Figure 6:
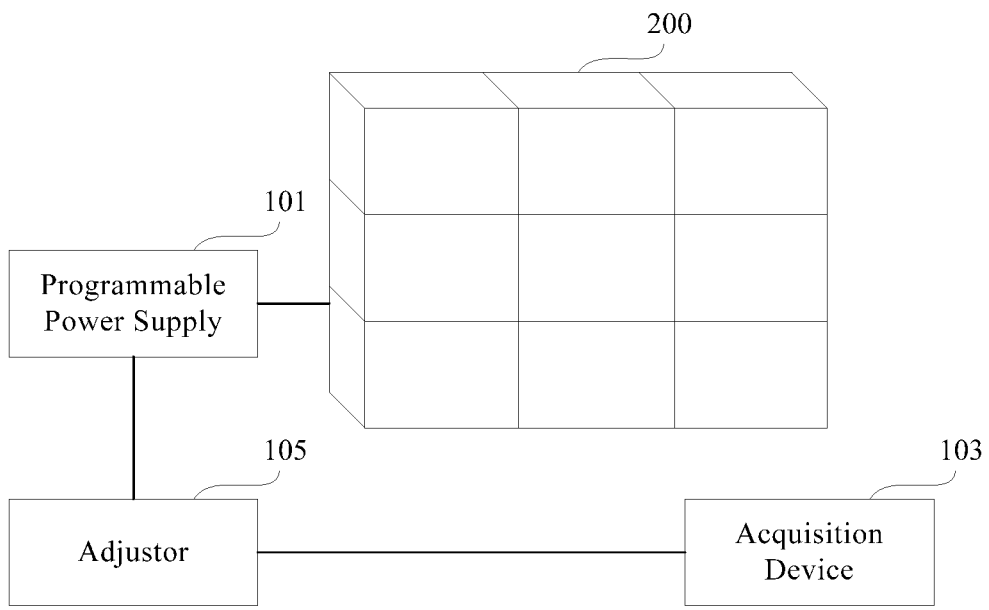
FIG. 6 is a schematic diagram showing a structure of a device for adjusting uniformity according to an embodiment of the present disclosure.

FIG. 6 is a schematic diagram showing a structure of a device for adjusting uniformity according to an embodiment of the present disclosure. The device shown in FIG. 6 may be employed to implement the method shown in FIG. 1.

As shown in FIG. 6, the device for adjusting uniformity according to the present embodiment of the present disclosure may include a programmable power supply 101, an acquisition device 103, and an adjustor 105.

The programmable power supply 101 is configured to power a spliced display device 200 with different power supplying configurations within a first voltage range. The spliced display device 200 may be the spliced display device shown in FIG. 2.

The acquisition device 103 is configured to acquire brightness information of display areas of splicing components of the spliced display device 200 under the power supplying configurations.

The adjustor 105 is configured to calculate uniformities of the spliced display device 200 under the power supplying configurations according to the brightness information, and determine the power supplying configuration corresponding to the maximum uniformity.

Specifically, in the present embodiment, the acquisition device 103 may be an image sensor (e.g., a CCD). The adjustor 105 may be an upper computer (or a master computer) of the programmable power supply 101, and the upper computer (or the master computer) may send various commands to the programmable power supply 101, to cause the programmable power supply 101 to provide the spliced display device 200 with the power supplying configurations. In other embodiments, the acquisition device 103 may be a different acquisition device from that described above, such as an illuminometer or the like, as long as the acquisition device can acquire brightnesses at center points of the display areas of the spliced display device 200 or acquire light intensities of the light-emitting components of the spliced display device 200. These kinds of acquisition devices can achieve the same technical effects. Further, the adjustor 105 may be a different kind of computer, a mobile smart device (such as a smartphone, a tablet, or the like) coupled to the programmable power supply 101 and the acquisition device 103 in a communication link, or any other kind of smart device, and these kinds of acquisition devices can achieve the same technical effects.

The adjustment principle of the device for adjusting uniformity may be referred to the method shown in FIG. 1 and the foregoing description, and detailed description thereof is omitted.

Figure 7:
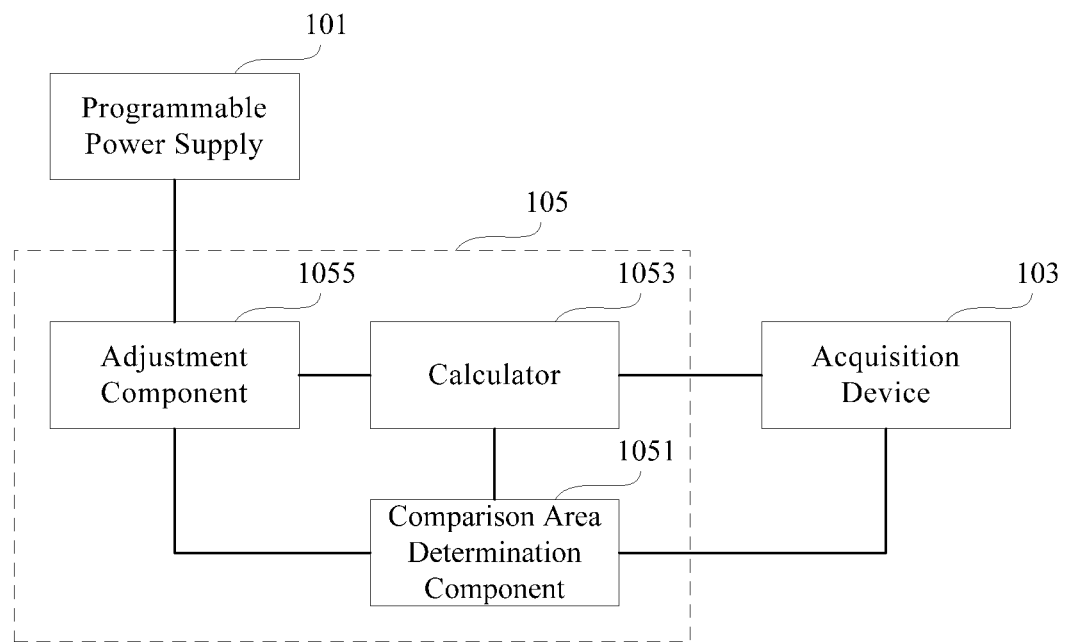
FIG. 7 is a schematic structural diagram of an exemplary implementation of the device shown in FIG. 6.

FIG. 7 is a schematic structural diagram of an exemplary implementation of the device shown in FIG. 6. The device shown in FIG. 7 may be employed to implement the methods shown in FIGS. 3 and 4.

As shown in FIG. 7, in the exemplary implementation, the programmable power supply 101 is further configured to power the spliced display device 200 with power supplying configurations having a same current. The acquisition device 103 is further configured to acquire brightness information of the display areas under the power supplying configurations having the same current. The power supplying configurations having the same current may refer to that the light-emitting components of the spliced display device 200 have the same current, or the splicing components of the spliced display device 200 have the same current.

The adjustor 105 may include a comparison area determination component 1051, a calculator 1053, and an adjustment component 1055. For example, the comparison area determination component 1051 is configured to determine a first display area and a second display area which have a maximum brightness difference therebetween, according to the brightness information of the display areas under the power supplying configurations having the same current. The calculator 1053 is configured to calculate uniformities under the power supplying configurations, according to the brightness information of the first display area and the second display area under the power supplying configurations. The adjustment component 1055 is configured to determine the power supplying configuration corresponding to the maximum uniformity according to the calculated uniformities.

The adjustment principle of the device according to the present embodiment may be referred to the method shown in FIG. 3 and the foregoing description.

In an exemplary implementation, the programmable power supply 101 is further configured to traverse a first set of power supplying configurations and a second set of power supplying configurations, respectively. For example, each power supplying configuration of the first set of power supplying configurations is within the first voltage range, and an interval between any two adjacent voltages in each power supplying configuration of the first set of power supplying configurations is a first voltage. Each power supplying configuration of the second set of power supplying configurations is within a second voltage range, an interval between any two adjacent voltages in each power supplying configuration of the second set of power supplying configurations is a second voltage, and the second voltage is less than the first voltage.

The acquisition device 103 is further configured to acquire a first set of brightness information of the first display area and the second display area under the first set of power supplying configurations, and acquire a second set of brightness information of the first display area and the second display area under the second set of power supplying configurations.

The calculator 1053 is further configured to calculate a first set of uniformities according to the first set of brightness information, and calculate a second set of uniformities according to the second set of brightness information.

The adjustment component 1055 is further configured to determine a uniformity increasing section and the second voltage range corresponding to the uniformity increasing section according to the first set of uniformities, generate the second set of power supplying configurations according to the second voltage range, and determine the power supplying configuration corresponding to the maximum uniformity according to the second set of uniformities.

The adjustment principle of the device according to the present exemplary implementation may be referred to the method shown in FIG. 4 and the foregoing description.

Figure 8:
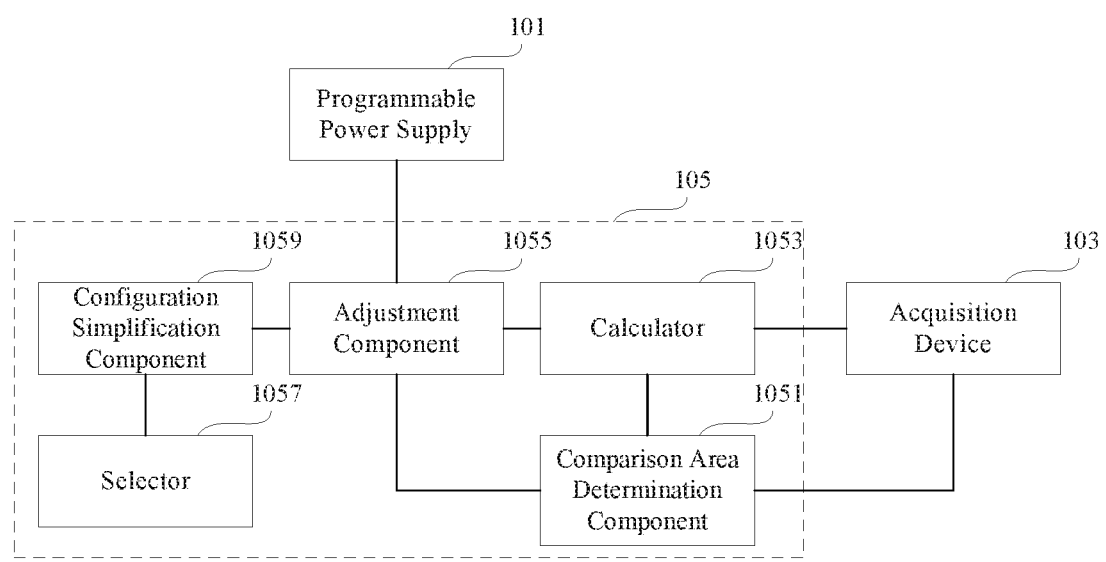
FIG. 8 is a schematic structural diagram of another exemplary implementation of the device shown in FIG. 6.

FIG. 8 is a schematic structural diagram of another exemplary implementation of the device shown in FIG. 6. The device shown in FIG. 8 may be employed to implement the method shown in FIG. 5.

As shown in FIG. 8, in the exemplary implementation, the adjustor 105 may further include a selector 1057 and a configuration simplification component 1059.

The selector 1057 is configured to select light-emitting components or splicing components of the spliced display device 200 which have small contribution to the uniformities, according to a manner in which the uniformities are calculated.

The configuration simplification component 1059 is configured to simplify each of the power supplying configurations according to a selection result obtained by the selector 1057.

The adjustment principle of the device according to the present exemplary implementation may be referred to the method shown in FIG. 5 and the foregoing description.

Figure 9:
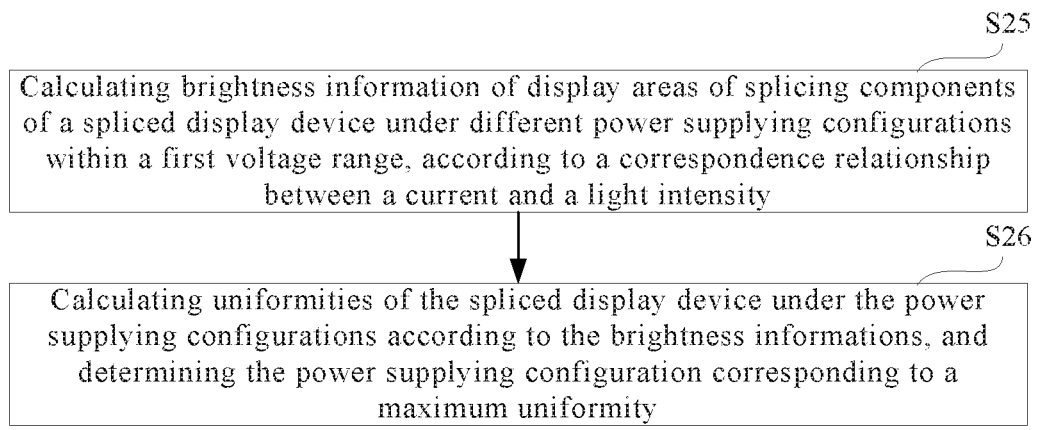
FIG. 9 is a schematic flowchart showing another method for adjusting uniformity according to another embodiment of the present disclosure.

FIG. 9 is a schematic flowchart showing another method for adjusting uniformity according to another embodiment of the present disclosure. As shown in FIG. 9, the method for adjusting uniformity according to the present embodiment of the present disclosure includes the following steps S25 and S26.

The step S25 includes calculating brightness information of display areas of splicing components of the spliced display device under different power supplying configurations within the first voltage range, according to a correspondence relationship between a current and a light intensity.

The step S26 includes calculating uniformities of the spliced display device under the power supplying configurations according to the brightness information, and determining the power supplying configuration corresponding to a maximum uniformity.

Specifically, the method for adjusting uniformity shown in FIG. 9 differs from that shown in FIG. 1 in that, brightness information corresponding to different power supplying configurations is calculated according to a correspondence relationship between a current and a light intensity, instead of that brightness information is acquired by actually powering the spliced display device. That is, brightness information is acquired physically in the method shown in FIG. 1, whereas brightness information is acquired by a virtual simulation in the method shown in FIG. 9. For example, the correspondence relationship between a current and a light intensity may be obtained in advance by experiments and stored in a relevant memory.

In a case where the brightness information represents a light intensity of each of the light-emitting components, a manner in which the brightness information is calculated is as follows: the light intensity of the light-emitting component is calculated according to a supplying current of the light-emitting component under each of the power supplying configurations and the correspondence relationship between a current and a light intensity.

In a case where the brightness information represents a brightness at the center point of each of the display areas, a manner in which the brightness information is calculated is as follows: a light intensity of each of the light-emitting components is calculated as described above, then an illumination at the center point of each of the display areas is calculated according to the light intensity of each of the light-emitting components and a distance between each of the light-emitting components and each of the display areas, and finally a brightness at the center point of each of the display areas is calculated according to the illumination and a correction coefficient for each of the display areas.

In the above embodiments, different power supplying configurations meeting the brightness requirement are automatically traversed by simulated powering so as to calculate brightness information corresponding to the power supplying configurations, and calculate uniformities according to the brightness information. Thus, the power supplying configuration corresponding to a maximum uniformity is determined, and automatic adjustment of uniformities of the spliced display device is achieved.

Figure 10:
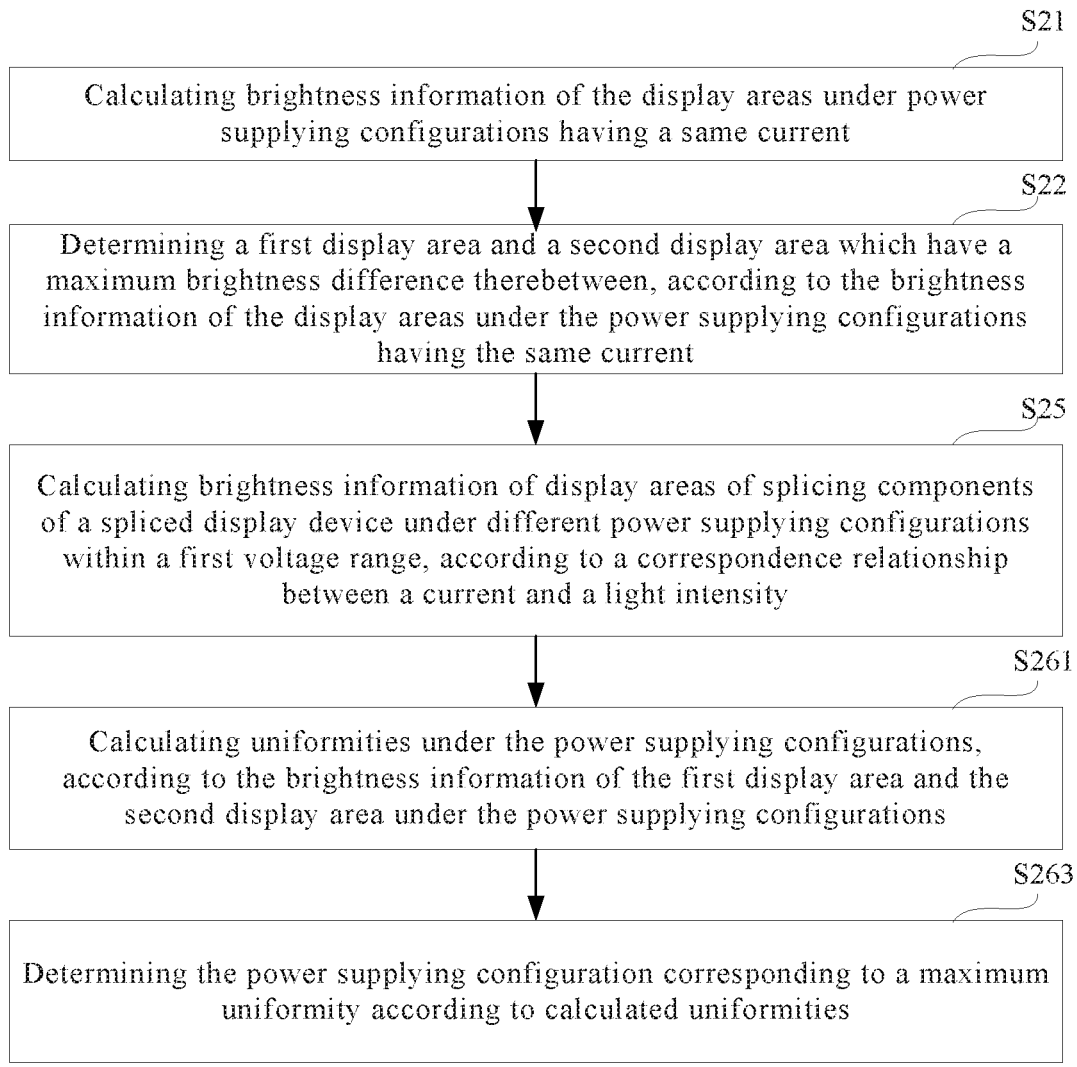
FIG. 10 is a schematic flowchart showing an exemplary implementation of the method shown in FIG. 9.

FIG. 10 is a schematic flowchart showing an exemplary implementation of the method shown in FIG. 9. As shown in FIG. 10, in the exemplary implementation, the method may further include the following steps S21 and S22.

The step S21 includes calculating brightness information of the display areas under power supplying configurations having a same current.

The step S22 includes determining a first display area and a second display area which have a maximum brightness difference therebetween, according to the brightness information of the display areas under the power supplying configurations having the same current.

Further, the step S26 may include the following steps S261 and S263.

The step S261 includes calculating uniformities under the power supplying configurations, according to the brightness information of the first display area and the second display area under the power supplying configurations.

The step S263 includes determining the power supplying configuration corresponding to a maximum uniformity according to the calculated uniformities.

Specifically, the method for adjusting uniformity shown in FIG. 10 differs from that shown in FIG. 3 in that, brightness information corresponding to the power supplying configurations are calculated according to the correspondence relationship between a current and a light intensity, instead of that brightness information is acquired by actually powering the spliced display device.

In the exemplary implementation, a manner in which a uniformity U is calculated is as follows:

$$U = L_M / L_N = (K_M E_M)/(K_N E_N) = \left( K_M \sum_{j=1}^{k} \frac{I_{Mj}}{S_{Mj}^2} \right) \bigg/ \left( K_N \sum_{j=1}^{k} \frac{I_{Nj}}{S_{Nj}^2} \right),$$

where, $L_M$ and $L_N$ are brightnesses at the center points of the first display area and the second display area, respectively, $K_M$ and $K_N$ are correction coefficients (which may be determined in advance by experiments) for the first display area and the second display area, respectively, $E_M$ and $E_N$ are illuminations at the center points of the first display area and the second display area, respectively, j is a serial number of each of the light-emitting components (e.g., each of the serial numbers 1 to 18 of the LED strip lights shown in FIG. 2) of the spliced display device, k is a quantity (e.g., 18 in the example shown in FIG. 2) of the light-emitting components, $I_{Mj}$ and $I_{Nj}$ are light intensities of the $j^{th}$ one of the light-emitting components at the center points of the first display area and the second display area, respectively, and $S_{Mj}$ and $S_{Nj}$ are distances from the $j^{th}$ light-emitting component to the center points of the first display area and the second display area, respectively.

Figure 11:
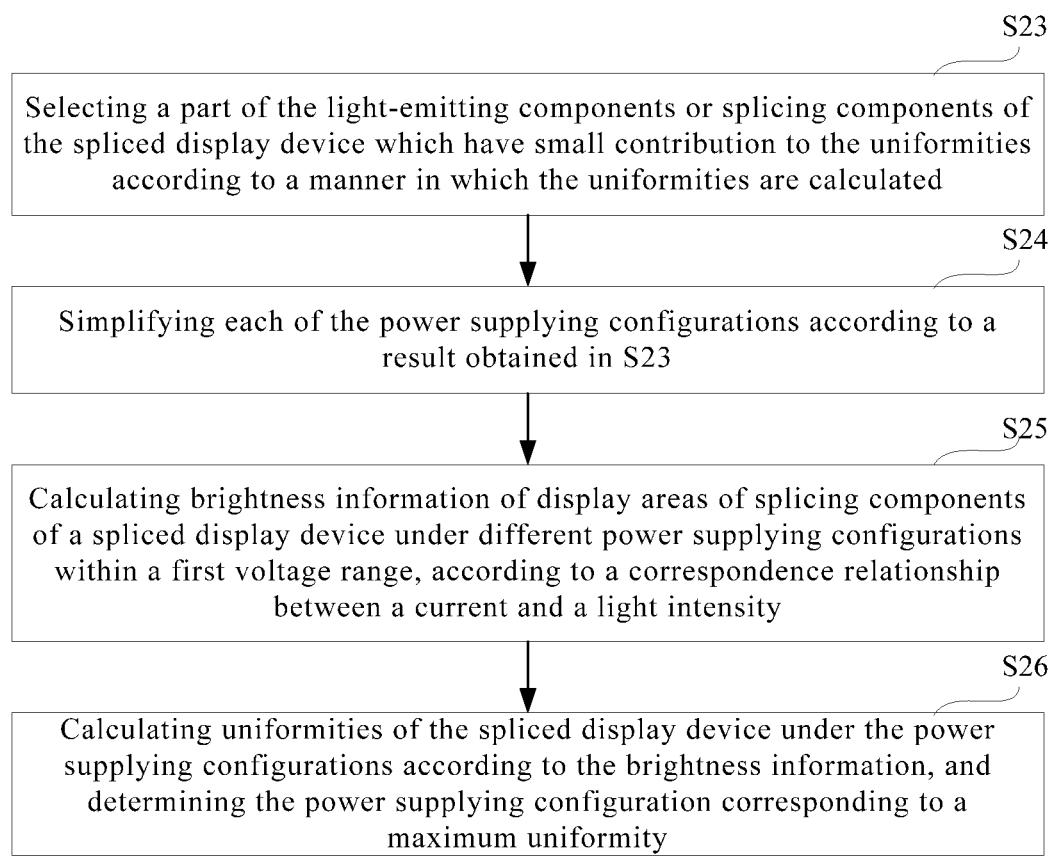
FIG. 11 is a schematic flowchart showing another exemplary implementation of the method shown in FIG. 9.

FIG. 11 is a schematic flowchart showing another exemplary implementation of the method shown in FIG. 9. As shown in FIG. 11, in the present exemplary implementation, the method may further include the following steps S23 and S24.

The step S23 includes selecting light-emitting components or splicing components of the spliced display device which have small contribution to the uniformities according to the manner in which the uniformities are calculated.

The step S24 includes simplifying each of the power supplying configurations according to a selection result obtained in the step S23.

Specifically, the method for adjusting uniformity shown in FIG. 11 differs from that shown in FIG. 5 in that, brightness information corresponding to the power supplying configurations is calculated according to the correspondence relationship between a current and a light intensity, instead of that brightness information is acquired by actually powering the spliced display device.

Further, in the methods for adjusting uniformity implemented by the virtual simulation modes shown in FIGS. 9 to 11, an amount of calculation may also be reduced by employing the layered adjustment mode of the method shown in FIG. 4.

Figure 12:
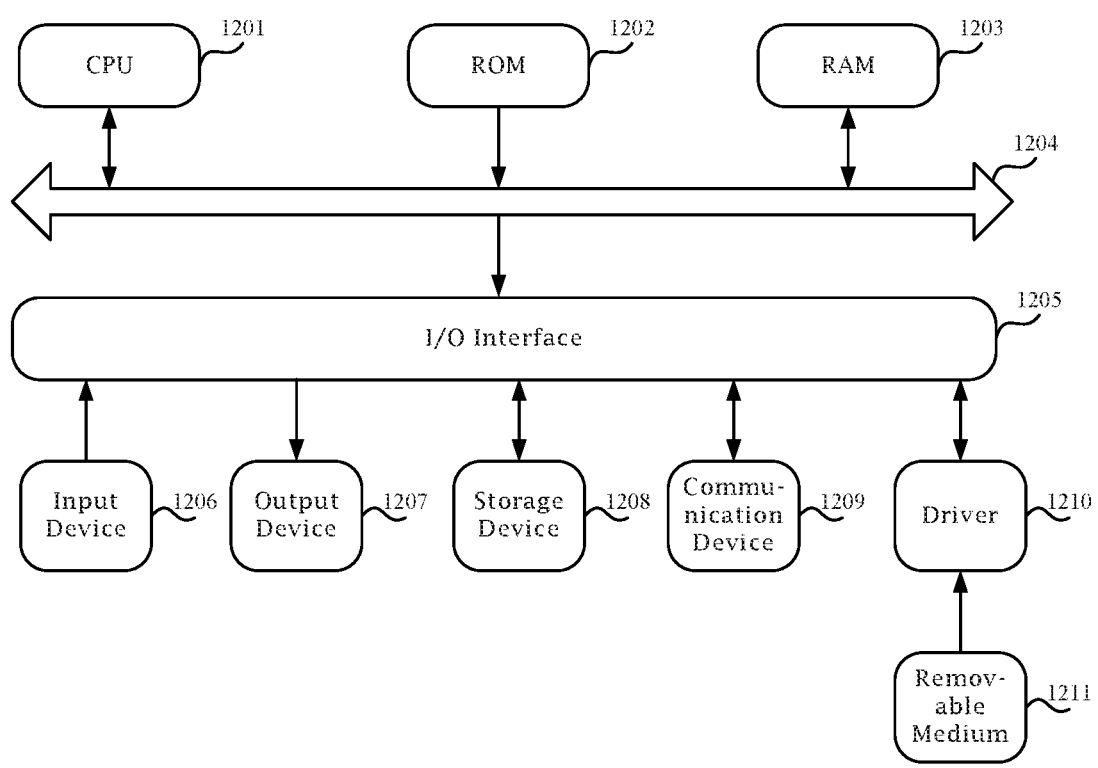
FIG. 12 is a schematic diagram showing a structure of an apparatus according to an embodiment of the present disclosure.

FIG. 12 is a schematic diagram showing a structure of an apparatus according to an embodiment of the present disclosure. For example, the apparatus may be employed to implement the methods for adjusting uniformity provided by the embodiments of the present disclosure.

As shown in FIG. 12, as another aspect, the present disclosure further provides an apparatus, which includes at least one central processing unit (CPU) or processor 1201 performing various suitable actions or processes according to programs stored in a read only memory (ROM) 1202 or loaded from a storage device 1208 into a random access memory (RAM) 1203. The RAM 1203 may further store various programs and data required for the operations of the apparatus shown in FIG. 12. The CPU 1201, the ROM 1202 and the RAM 1203 are connected to each other via a bus 1204. An input/output (I/O) interface 1205 is connected to the bus 1204.

The apparatus may further include the following components connected to the I/O interface 1205: an input device 1206 including a keyboard, a mouse, or the like; an output device 1207 including a cathode ray tube (CRT), a liquid crystal display (LCD), a speaker, or the like; a storage device 1208 including a hard disk or the like; and a communication device 1209 including a network interface card such as a LAN card, a modem, or the like. The communication device 1209 performs communication processing via a network such as the Internet. A driver 1210 is also connected to the I/O interface 1205 as needed. A removable medium 1211 such as a magnetic disk, an optical disk, a magneto-optical disk, a semiconductor memory, or the like is mounted on the driver 1210 as needed, so that a computer program read out therefrom is installed into the storage device 1208 as needed.

Further, according to an embodiment of the present disclosure, the method for adjusting uniformity according to each of the above embodiments may be implemented as a computer program. For example, an embodiment of the present disclosure provides a computer program product including a computer program stored on a tangible, machine-readable medium, and the computer program includes program codes for implementing any one of the methods for adjusting uniformity according to the present disclosure. In such an embodiment, the computer program may be downloaded and installed from the network via the communication device 1209, and/or installed in the apparatus shown in FIG. 12 from the removable medium 1211.

As another aspect, the present disclosure provides a computer readable storage medium having at least one computer program stored thereon. When executed by at least one processor, the computer program causes the at least one processor to implement any one of the methods for adjusting uniformity provided by the present disclosure. The computer readable storage medium may be a computer readable storage medium included in the apparatus of the above-described embodiment, or a computer readable storage medium that is independent of the apparatus and is not incorporated into the apparatus.

The methods for adjusting uniformity, the device for adjusting uniformity, the apparatus, and the computer readable storage medium provided by the embodiments of the present disclosure achieve automatic adjustment of uniformities of the spliced display device, by automatically traversing different power supplying configurations meeting the brightness requirements to acquire corresponding brightness information, calculating uniformities according to the brightness information, and determining the power supplying configuration corresponding to a maximum uniformity. The methods and the device provided by some embodiments of the present disclosure may acquire brightness information by actual power supplying configurations. The methods, the apparatus, and the storage medium provided by other embodiments of the present disclosure may calculate brightness information by simulated power supplying configurations.

The methods for adjusting uniformity, the device for adjusting uniformity, the apparatus, and the computer readable storage medium provided by some embodiments of the present disclosure calculate uniformities by selecting two display areas having the maximum brightness difference therebetween, and thus need not to make a comparison between any other two display areas. Thus, the calculation of uniformities is simplified, and the efficiency of adjustment is increased.

The methods for adjusting uniformity and the device for adjusting uniformity provided by some embodiments of the present disclosure further reduce an amount of calculation for a high-precision adjustment by a layered adjustment, and increase the efficiency for the high-precision adjustment.

The methods for adjusting uniformity, the device for adjusting uniformity, the apparatus, and the computer readable storage medium provided by some embodiments of the present disclosure simplify each of the power supplying configurations by analyzing weights of the light-emitting components on a uniformity. Thus, an amount of calculation is reduced greatly, and the efficiency of adjustment is increased.

The flowcharts and block diagrams in the figures illustrate the architecture, functions, and operations that may be implemented by the systems, methods, and computer program products according to various embodiments of the present disclosure. In this regard, each block in the flowcharts or block diagrams may represent a module, a program segment, or a part of codes, and the module, the program segment, or the part of codes may include at least one executable instruction for implementing a desired logic function. It should also be noted that in some alternative implementations, the functions illustrated in the blocks may also occur in different orders from those illustrated in the figures. For example, two blocks illustrated sequentially may in fact be executed substantially in parallel, and may sometimes be executed in the reverse order, depending on the functions involved. It should also be noted that each block of the block diagrams and/or flowcharts, and combinations of the blocks in the block diagrams and/or flowcharts, may be implemented by special purpose hardware-based systems that perform the specified functions or operations, or may be implemented by a combination of dedicated hardware and computer instructions.

Units or modules involved in the embodiments of the present disclosure may be implemented through software, and may also be implemented through hardware. Any described units or modules may also be provided in the processor. For example, each of the units may be a software program installed in a computer or a mobile smart device, or may be a separately provided hardware device. For example, the names of the units or modules may not constitute a limitation to the units or modules themselves in some cases.

The above descriptions are merely exemplary embodiments of the present disclosure and explanations of applied technical principles. One of ordinary skill in the art should be understood that, the scope of protection of the present disclosure is not limited to the technical solutions formed by the specific combination of technical features described above, but should also cover other technical solutions formed by any combination of the above technical features and their equivalent technical features, without departing from the concept of the present disclosure, e.g., the technical solutions formed by mutual replacements between the above-described features and technical features disclosed in the present disclosure and (but not limited to) having similar functions.

What is claimed is:

1. A method for adjusting uniformity, comprising steps of:
    powering a plurality of splicing components or a plurality of light-emitting components provided on the plurality of splicing components comprised in a spliced display device with different power supplying configurations of a plurality of different voltages within a first voltage range, and acquiring brightness information of display areas of the plurality of splicing components of the spliced display device under the power supplying configurations;
    calculating uniformities of the spliced display device under the power supplying configurations according to the brightness information, and determining the power supplying configuration of the plurality of different voltages corresponding to a maximum uniformity;
    powering the spliced display device with power supplying configurations having a same current, and acquiring brightness information of the display areas under the power supplying configurations having the same current; and
    determining a first display area and a second display area which have a maximum brightness difference therebetween, according to the brightness information of the display areas under the power supplying configurations having the same current;
    wherein the steps of calculating uniformities of the spliced display device under the power supplying configurations according to the brightness information, and determining the power supplying configuration corresponding to a maximum uniformity comprise steps of:
    calculating uniformities under the power supplying configurations, according to the brightness information of the first display area and the second display area under the power supplying configurations; and
    determining the power supplying configuration corresponding to a maximum uniformity according to calculated uniformities.

2. The method according to claim 1, wherein the steps of powering a spliced display device with different power supplying configurations within the first voltage range, and acquiring brightness information of display areas of splicing components of the spliced display device under the power supplying configurations comprise steps of:
    traversing a first set of power supplying configurations, and acquiring a first set of brightness information of the first display area and the second display area under the first set of power supplying configurations, wherein each of the first set of power supplying configurations is within the first voltage range, and an interval between any two adjacent voltages in each of the first set of power supplying configurations is a first voltage;
    calculating a first set of uniformities according to the first set of brightness information, and determining a uniformity increasing section and a second voltage range corresponding to the uniformity increasing section according to the first set of uniformities;
    generating a second set of power supplying configurations according to the second voltage range, wherein each of the second set of power supplying configurations is within the second voltage range, an interval between any two adjacent voltages in each of the second set of power supplying configurations is a second voltage, and the second voltage is less than the first voltage; and
    traversing the second set of power supplying configurations, and acquiring a second set of brightness information of the first display area and the second display area under the second set of power supplying configurations;
    wherein the steps of calculating uniformities of the spliced display device under the power supplying configurations according to the brightness information, and determining the power supplying configuration corresponding to a maximum uniformity comprise steps of:
    calculating a second set of uniformities according to the second set of brightness information; and
    determining the power supplying configuration corresponding to a maximum uniformity according to the second set of uniformities.

3. The method according to claim 1, wherein the power supplying configurations comprise power supplying configurations for the plurality of light-emitting components of the spliced display device or power supplying configurations for the plurality of splicing components of the spliced display device.

4. The method according to claim 3, further comprising steps of:
    selecting a part of the plurality of light-emitting components or the plurality of splicing components of the spliced display device which have small contribution to the uniformities according to a manner in which the uniformities are calculated; and
    simplifying each of the power supplying configurations according to a selection result obtained in the step of selecting.

5. The method according to claim 3, wherein the brightness information represents one of a brightness at a center point of each of the display areas and a light intensity of each of the plurality of light-emitting components.

6. A device for adjusting uniformity, comprising a programmable power supply, an acquisition device, and an adjustor, wherein the programmable power supply is configured to power a plurality of splicing components or a plurality of light-emitting components provided on the plurality of splicing components comprised in a spliced display device with different power supplying configurations of a plurality of different voltages within a first voltage range;

the acquisition device is configured to acquire brightness information of display areas of the plurality of splicing components of the spliced display device under the power supplying configurations; and the adjustor is configured to calculate uniformities of the spliced display device under the power supplying configurations according to the brightness information, and determine the power supplying configuration of the plurality of different voltages corresponding to a maximum uniformity;

wherein the programmable power supply is further configured to power the spliced display device with power supplying configurations having a same current;

the acquisition device is further configured to acquire brightness information of the display areas under the power supplying configurations having the same current; and the adjustor comprises:

a comparison area determination component, configured to determine a first display area and a second display area which have a maximum brightness difference therebetween, according to the brightness information of the display areas under the power supplying configurations having the same current;

a calculator, configured to calculate uniformities under the power supplying configurations, according to the brightness information of the first display area and the second display area under the power supplying configurations; and an adjustment component, configured to determine the power supplying configuration corresponding to a maximum uniformity according to calculated uniformities.

7. The device according to claim 6, wherein the programmable power supply is further configured to traverse a first set of power supplying configurations and a second set of power supplying configurations, respectively, wherein each of the first set of power supplying configurations is within the first voltage range, an interval between any two adjacent voltages in each of the first set of power supplying configurations is a first voltage, each of the second set of power supplying configurations is within a second voltage range, an interval between any two adjacent voltages in each of the second set of power supplying configurations is a second voltage, and the second voltage is less than the first voltage;

the acquisition device is further configured to acquire a first set of brightness information of the first display area and the second display area under the first set of power supplying configurations, and acquire a second set of brightness information of the first display area and the second display area under the second set of power supplying configurations;

the calculator is further configured to calculate a first set of uniformities according to the first set of brightness information, and calculate a second set of uniformities according to the second set of brightness information; and the adjustment component is further configured to determine a uniformity increasing section and the second voltage range corresponding to the uniformity increasing section according to the first set of uniformities, generate the second set of power supplying configurations according to the second voltage range, and determine the power supplying configuration corresponding to a maximum uniformity according to the second set of uniformities.

8. The device according to claim 6, wherein the power supplying configurations comprise power supplying configurations for the plurality of light-emitting components of the spliced display device or power supplying configurations for the plurality of splicing components of the spliced display device.

9. The device according to claim 8, wherein the adjustor further comprises:

a selector, configured to select a part of the plurality of light-emitting components or the plurality of splicing components of the spliced display device which have small contribution to the uniformities according to a manner in which the uniformities are calculated; and a configuration simplification component, configured to simplify each of the power supplying configurations according to a selection result from the selector.

10. The device according to claim 8, wherein the acquisition device comprises one of an image sensor and an illuminometer, the brightness information represents a brightness at a center point of each of the display areas in a case where the acquisition device comprises the image sensor, and represents a light intensity of each of the plurality of light-emitting components in a case where the acquisition device comprises the illuminometer.

11. A method for adjusting uniformity, comprising steps of:

calculating brightness information of display areas of a plurality of splicing components of a spliced display device under different power supplying configurations of a plurality of different voltages within a first voltage range, according to a correspondence relationship between a current and a light intensity;

calculating uniformities of the spliced display device under the power supplying configurations according to the brightness information, and determining the power supplying configuration of the plurality of different voltages corresponding to a maximum uniformity;

calculating brightness information of the display areas under power supplying configurations having a same current; and determining a first display area and a second display area which have a maximum brightness difference therebetween, according to the brightness information of the display areas under the power supplying configurations having the same current;

wherein the steps of calculating uniformities of the spliced display device under the power supplying configurations according to the brightness information, and determining the power supplying configuration corresponding to a maximum uniformity comprise steps of:

calculating uniformities under the power supplying configurations, according to the brightness information of the first display area and the second display area under the power supplying configurations; and determining the power supplying configuration corresponding to a maximum uniformity according to calculated uniformities.

12. The method according to claim 11, wherein a manner in which the uniformity is calculated is as follows:

$$U = L_M/L_N = (K_M E_M)/(K_N E_N) = \left(K_M \sum_{j=1}^{k} \frac{I_{Mj}}{S_{Mj}^2}\right) / \left(K_N \sum_{j=1}^{k} \frac{I_{Nj}}{S_{Nj}^2}\right),$$

where U is the uniformity, $L_M$ and $L_N$ are brightnesses at center points of the first display area and the second display area, respectively, $K_M$ and $K_N$ are correction coefficients for the first display area and the second display area, respectively, $E_M$ and $E_N$ are illuminations at the center points of the first display area and the second display area, respectively, j is a serial number of each of the light-emitting components of the spliced display device, k is a quantity of the light-emitting components, $I_{Mj}$ and $I_{Nj}$ are light intensities of a $j^{th}$ one of the light-emitting components at the center points of the first display area and the second display area, respectively, and $S_{Mj}$ and $S_{Nj}$ are distances from the $j^{th}$ light-emitting component to the center points of the first display area and the second display area, respectively.

13. The method according to claim 11, wherein the power supplying configurations comprise power supplying configurations for light-emitting components of the spliced display device or power supplying configurations for the plurality of splicing components of the spliced display device.

14. The method according to claim 13, further comprising steps of:
- selecting a part of the light-emitting components or the plurality of splicing components of the spliced display device which have small contribution to the uniformities according to a manner in which the uniformities are calculated; and
- simplifying each of the power supplying configurations according to a selection result obtained in the step of selecting.

15. An apparatus, comprising:
- at least one processor; and
- a memory, configured to store at least one program,
- wherein when executed by the at least one processor, the at least one program causes the at least one processor to perform the method according to claim 11.

16. A non-transitory computer readable storage medium having a computer program stored thereon, wherein when executed by a processor, the computer program implements the method according to claim 11.

* * * * *